United States Patent [19]

Sallavanti et al.

[11] Patent Number: 5,271,872

[45] Date of Patent: Dec. 21, 1993

[54] LASER-ATTENUATIVE OPTICAL FILTER

[75] Inventors: Robert A. Sallavanti, Dalton; Michael J. Lubianetsky, Blakely, both of Pa.

[73] Assignee: Gentex Corporation, Carbondale, Pa.

[21] Appl. No.: 917,914

[22] Filed: Jul. 21, 1992

Related U.S. Application Data

[63] Continuation of Ser. No. 696,280, Apr. 29, 1991, abandoned, which is a continuation of Ser. No. 275,933, Nov. 25, 1988, abandoned.

[51] Int. Cl.$^5$ .............. F21V 9/00; F21V 9/04; G02B 5/22
[52] U.S. Cl. .................. 252/582; 252/587; 252/589; 359/350; 359/356; 359/357; 359/885
[58] Field of Search ............ 252/582, 587, 588, 589; 359/350, 356, 357, 885, 361

[56] References Cited

U.S. PATENT DOCUMENTS

| | | | |
|---|---|---|---|
| 3,341,464 | 9/1967 | Susi et al. | 252/300 |
| 3,400,156 | 9/1968 | Milionis et al. | 260/576 |
| 3,687,863 | 8/1972 | Wacher | 252/300 |
| 3,853,783 | 12/1974 | Tucker | 252/300 |
| 4,622,174 | 11/1986 | McKoy et al. | 252/582 |
| 4,657,345 | 4/1987 | Gordon | 350/311 |
| 4,885,114 | 12/1989 | Gordon et al. | 252/589 |
| 4,933,110 | 6/1990 | Tucker | 252/582 |
| 5,005,926 | 4/1991 | Spielberger | 350/1.1 |

OTHER PUBLICATIONS

Neunhoeffer et al., Ber., 92, 245 (1959).
Griffiths et al., Mol. Cryst. Liq. Cryst., 33, 149, 156–57 (1970).
Grigg et al., Chemical Communications, 1970, 1237.
Buchler, "Synthesis and Properties of Metalloporphyrins", in Dolphin (ed.), The Porphyrins, vol. I, pp. 389–483 (1978) Law, Inorg. Chem., 24, 1778 (1985).
Milgrom, Polyhedron, 4, 1661 (1985).

Primary Examiner—Philip Tucker
Attorney, Agent, or Firm—Shenier & O'Connor

[57] ABSTRACT

An optical filter for absorbing neodymium YAG-doubled laser radiation at 532 nanometers, comprising a polymeric matrix of transparent polycarbonate containing platinum deuteroporphyrin IX dimethyl ester, has an optical density of 1.8 at 532 nm while having a photopic luminous visible transmission of 53.8%. Optionally, the filter may contain other additives for absorption at other laser wavelengths, such as vanadyl tetra-4-tert-butylphthalocyanine for absorption of ruby laser radiation at 694 nanometers and tris(p-diethylaminophenyl)aminium hexafluoroantimonate for absorption of neodymium YAG laser radiation at 1064 nanometers.

9 Claims, 2 Drawing Sheets

FIG. 3
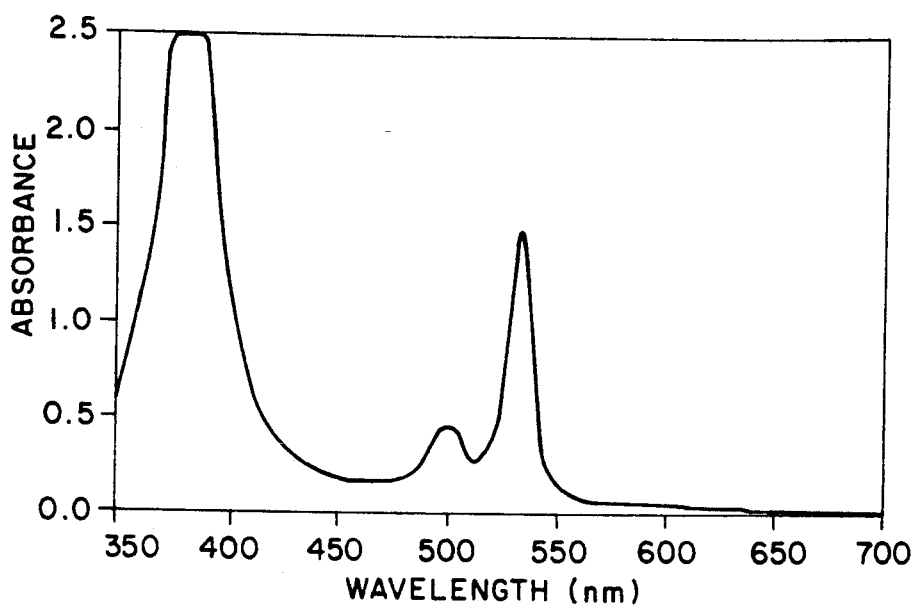
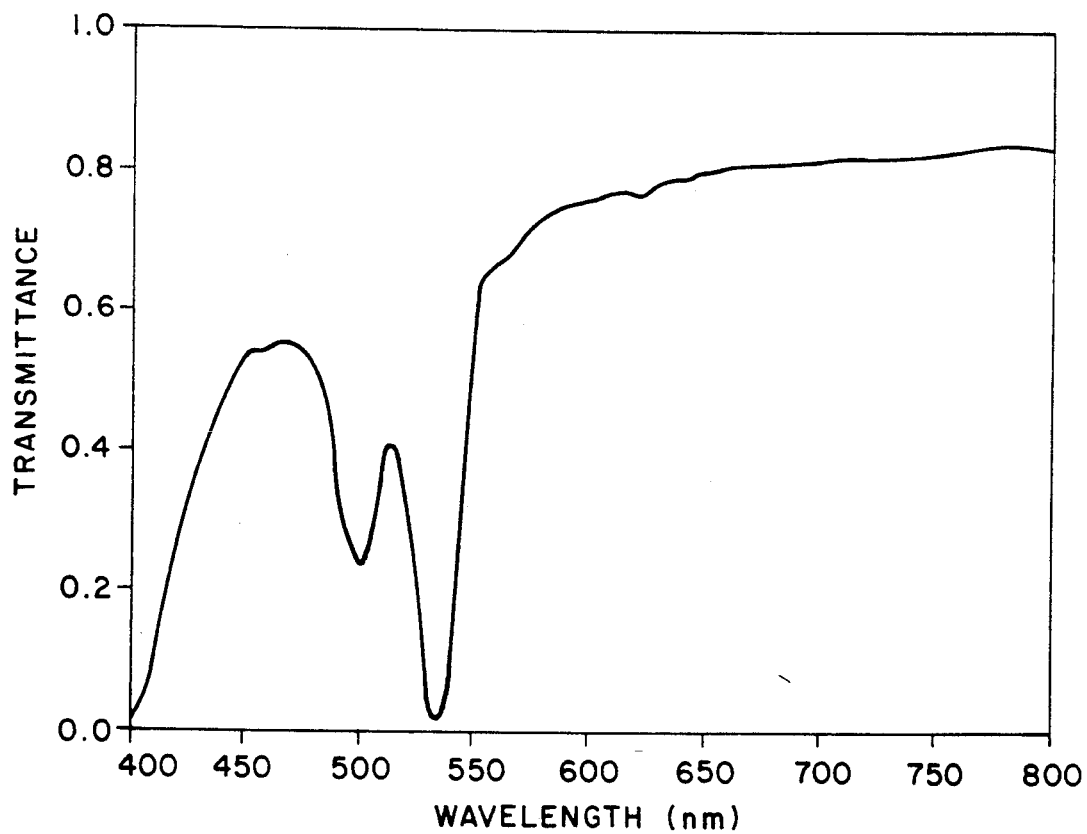
FIG. 4

LASER-ATTENUATIVE OPTICAL FILTER

This is a continuation of copending application Ser. No. 07/696,280, filed Apr. 29, 1991 now abandoned, which is a continuation of abandoned application Ser. No. 07/275,933 filed on Nov. 25, 1988.

BACKGROUND OF THE INVENTION

This invention relates to an optical filter for attenuating incident laser radiation and, more particularly, to a filter for absorbing neodymium YAG-doubled laser radiation at 532 nanometers (nm).

In certain applications, it is necessary to attenuate incident laser radiation at one or more laser wavelengths, while at the same time transmitting a substantial portion of the incoming radiation at other wavelengths. One such application involves visors worn by military personnel. Because of the extremely high intensity of the laser radiation, the attenuation at laser wavelengths must be correspondingly high: optical densities of 3 or more at the laser wavelength are typical for filters of this type. In order to satisfy these twin requirements of high attenuation at the laser wavelength and substantial transmission at adjacent wavelengths, the filter must have an extremely sharp cutoff characteristic.

Optical filters are commonly made by incorporating one or more compounds, selected for their absorption characteristics, into a suitable light-transmissive host material—in particular, a polymeric matrix such as polycarbonate. To be useful for such an application, the absorber must have several properties besides absorption at the desired wavelength. The compound should be soluble in the host material, and should be compatible with the host material and any other additives. The compound should be sufficiently stable to permit its incorporation and use in the desired host material without excessive degradation. Finally, the compound should be capable of being readily synthesized on the scale desired.

McKoy et al U.S. Pat. No. 4,622,174 discloses a transparent protective laser shield containing metalloporphyrins—more particularly, platinum octaethylporphyrin (PtOEP) for absorption of neodymium YAG-doubled laser radiation at 532 nm and vanadyl phthalocyanine (VOPc) for absorption of ruby laser radiation at 694 nm. Gordon U.S. Pat. No. 4,657,345 discloses a similar shield in which the absorbers are diffused into a surface of the host material rather than being disseminated uniformly through it. Although PtOEP absorbs strongly at 532 nm, its absorption maximum does not coincide with that wavelength, but occurs at a slightly longer wavelength, at about 537 nm. Because of the extreme sharpness of the absorption peak, this implies that more of the absorber must be used to achieve a given optical density at the laser wavelength than if the absorption maximum coincided with the laser wavelength. Not only is the absorber relatively expensive, because of the platinum used, but the resulting filter will have a lower transmittance at other wavelengths because of the greater amount of material used.

SUMMARY OF THE INVENTION

One object of our invention is to provide an optical filter that absorbs strongly at 532 nm.

Another object of our invention is to provide an optical filter that transmits a substantial amount of radiation at other wavelengths.

A further object of our invention is the provide an optical filter which may include other additives for absorption at other wavelengths.

Still another object of our invention is to provide an optical filter that is simple and inexpensive to manufacture.

In general, our invention contemplates an optical filter comprising a light-transmissive, preferably transparent polymeric matrix containing the compound known formally as dimethyl 3,7,12,17-tetramethyl-21H,23H-porphine-2,18-dipropionate platinum (II), and more informally as platinum deuteroporphyrin IX dimethyl ester, or PtDPIXDME. This compound, the preparation of which is described in Milgrom, Polyhedron, 4, 1661 (1985), has an absorption maximum of 533 nm in polycarbonate, almost exactly coincident with the laser emission wavelength of 532 nm. As a result, less of the compound than, say, PtOEP is required to achieve a given optical density at 532 nm. Not only is less platinum thus required as a starting material, but the filter transmittance at adjacent wavelengths is higher.

In use, the deuteroporphyrin compound may be incorporated into matrices or films of suitable light-transmissive, preferably transparent materials such as polycarbonate; acrylic polymers such as poly(methyl methacrylate); vinyl polymers such as poly(vinyl chloride); poly(allyl diglycol carbonate); and cellulose derivatives, preferably esters such as cellulose acetate, cellulose propionate, cellulose butyrate and the like, by such known methods as molding, extruding and casting to make solid sheets, plates, lenses, visors and the like.

The amount of absorber used in the host material is determined by the thickness of the host material and the optical density desired at the laser wavelength in accordance with the Beer-Lambert law:

$$A = OD = -\log T/T_0 = abc$$

where A is the absorbance, or optical density (OD), due to the presence of the absorber at a specific wavelength; T is the transmittance of the filter at that wavelength with the absorber present; $T_0$ is the transmittance of the filter at that wavelength with the absorber absent; $a$ is the mass absorption coefficient of the absorber in the host material at that wavelength (L/(g.cm)); b is the path length through the host material (cm); and c is the mass concentration of the absorber in the host material (g/L). Equivalently, the Beer-Lambert law may be expressed as $$A = \epsilon b c_m$$

where A and b are defined as before; $\epsilon$ is the molar extinction coefficient of the absorber in the host material at the wavelength in question (L/(mol.cm)); and $c_m$ is the molar concentration of the absorber in the host material (mol/L). Preferably, the host material should contain a sufficient amount of the absorber to have an optical density of at least about 2 at the laser wavelength. More preferably still, the filter should have an optical density of 3 or more at the laser wavelength.

The compound may also be used along with other additive such as dyes, infrared absorbers, ultraviolet absorbers, and stabilizers that do not adversely affect the compound or its absorptive properties. In particular, the deuteroporphyrin compound may be combined with a vanadyl phthalocyanine (VOPc) such as unsubstituted VOPc or, preferably, a more soluble substituted VOPc such as vanadyl tetra-4-tert-butylphthalocyanine for additional absorption at 694 nm. The compound may also be combined with a tris(p-dialkylaminophenyl)aminium salt, especially tris(p-diethylaminophenyl)aminium hexafluoroantimonate, for absorption at the neodymium laser wavelength of 1064 nm. If the latter compound is used with poly(allyl diglycol carbonate), it should preferably be introduced into the matrix after polymerization, as by dyeing, to avoid undesirable interactions.

The deuteroporphyrin compound may be prepared from its unmetallated precursor, deuteroporphyrin IX dimethyl ester, in the manner described in Milgrom, *Polyhedron*, 4, 1661 (1985). Vanadyl tetra-4-tert-butylphthalocyanine, if used as another additive for absorption at 694 nm, may be prepared from 4-tert-butylphthalonitrile and vanadium trichloride in the manner described in Law, *Inorg. Chem.*, 24, 1778 (1985). Alternatively, the vanadyl compound may be prepared from 4-tert-butylphthalic acid and vanadyl sulfate.

Milionis et al U.S. Pat. No. 3,400,156 describes the preparation of tris(p-dialkylaminophenyl)aminium salts and their incorporation into plastics as infrared absorbers. Susi et al U.S. Pat. No. 3,341,464 specifically describes the preparation and use of tris(p-dialkylaminophenyl)aminium hexafluoroarsenates and hexafluoroantimonates.

BRIEF DESCRIPTION OF THE DRAWINGS

In the accompanying drawings to which reference is made in the instant specification and which are to be read in conjunction therewith and in which like reference numerals are used to indicate like parts in the various views:

FIG. 3 is a graph of the absorption spectrum of the compound of FIG. 1 in solution.

FIG. 4 is a graph of the transmission spectrum of an optical filter containing the compound of FIG. 1.

DESCRIPTION OF THE PREFERRED EMBODIMENTS

EXAMPLE 1

Figure 1:
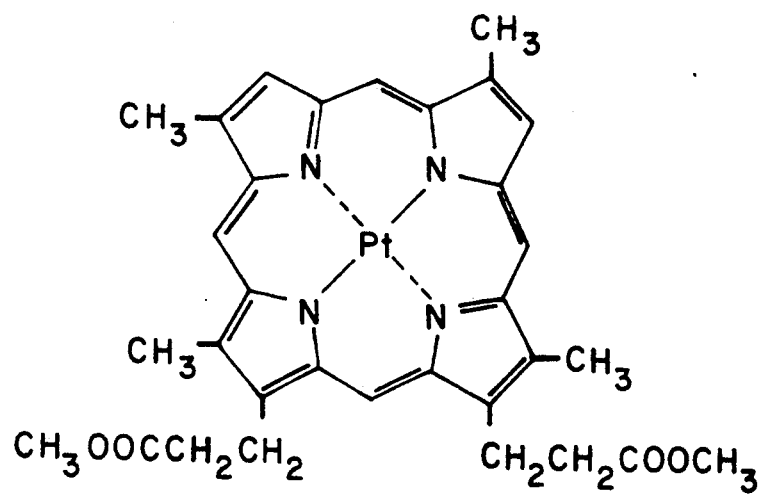
FIG. 1 shows the structural formula of the compound platinum deuteroporphyrin IX dimethyl ester.

Platinum deuteroporphyrin IX dimethyl ester (FIG. 1), was prepared in the manner described in Milgrom, *Polyhedron*, 4, 1661 (1985). 2.7 mg of the compound were dissolved in 100 mL of pyridine and placed in an absorption cell of 1 cm thickness. The extinction coefficient e observed at 533.5 nm was 41,000 L/(mol.cm). The absorption spectrum of the compound in pyridine solution is shown in FIG. 3. Absorption maxima were observed at 533.5 nm (A=1.488), 500.5 nm (0.479) and 384.0 nm (2.482). Absorption minima were observed at 649.5 nm (0.019), 513.0 nm (0.276) and 465.5 nm (0.164).

EXAMPLE 2

0.194 g of the porphyrin of Example 1 was mixed with 500 g of polycarbonate by placing the two materials in a blender for 1 minute. The mixture was dried at 250° F. for 1½ hours, and then injection molded to produce a disk 0.038 inch thick. The injection pressure alternated between a high of 1800 psi and a low of 1500 psi. The clamp pressure was 2100 psi, and cycle time 17.7 seconds. The nozzle temperature was 458° F., the front zone of the barrel was 450° F., and the rear zone of the barrel was 430° F.

The disk showed an intense absorption at 532 nm (OD=1.8), with high transmission of light at other wavelengths in the visible region. The transmission spectrum of the disk is shown in FIG. 4. The disk serves as a "single-notch" laser filter at 532 nm while exhibiting high visible-light transmission. The photopic luminous transmission (Illuminant C) was 53.8%.

EXAMPLE 3

Figure 2:
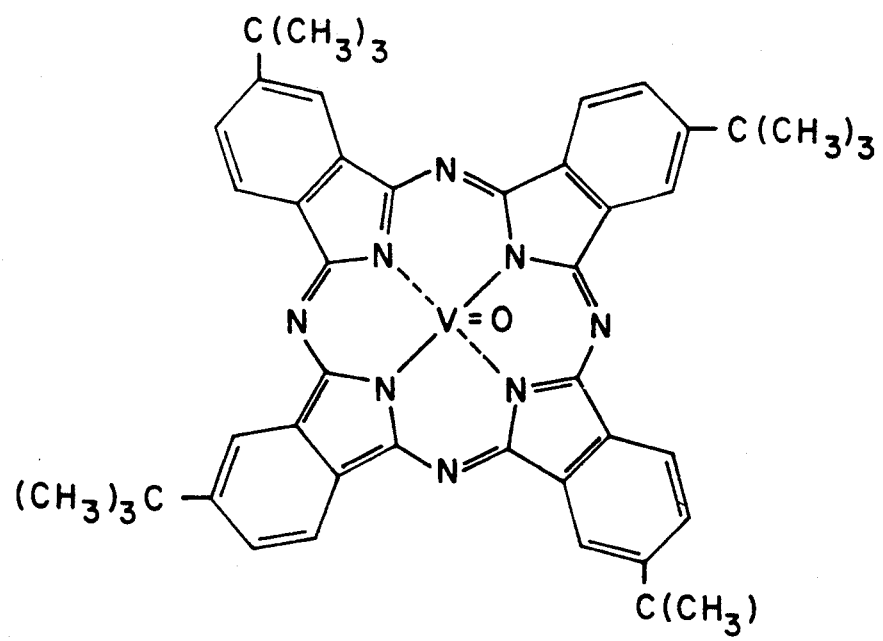
FIG. 2 shows the structural formula of the compound vanadyl tetra-4-tert-butylphthalocyanine.

To the mixture of Example 2 is introduced 0.0165 g of vanadyl tetra-4-tert-butylphthalocyanine (FIG. 2). The mixture was injection molded to produce a plate 0.110 inch thick. The plate exhibited an optical density of 3.4 at 532 nm and 1.5 at 694.3 nm (the ruby laser wavelength), with a photopic luminous transmission of 27.9%. The part serves as a highly light-transmissive laser filter which simultaneously filter laser radiation at 532 nm and 694.3 nm.

EXAMPLE 4

To the mixture of Example 2 is introduced 0.526 g of tris(p-diethylaminophenyl)aminium hexafluoroantimonate (U.S. Pat. No. 3,341,464). This mixture was injection molded to produce a plate 0.073 inch thick which exhibited optical densities of 2.7 at 532 nm and 2.8 at 1064 nm (neodymium YAG laser wavelength). The part serves as a highly light-transmissive laser filter which simultaneously filters laser radiation at the two noted wavelengths.

It will be seen that we have accomplished the objects of our invention. Our optical filter absorbs strongly at 532 nm, while at the same time having a high transmittance at adjacent wavelengths in the visible region. The light-absorbing compound of our filter is capable of incorporation in a plastic polymeric matrix, and may be used with other additives such as light absorbers.

It will be understood that certain features and subcombinations are of utility and may be employed without reference to other features and combinations. This is contemplated by and within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. An optical filter for absorbing radiation from a double neodymium YAG laser including in combination first notch filtering means having a sharp cutoff characteristic and comprising a porphyrin dye for providing selective high absorption of radiation at 532 nanometers wavelength and second filtering means comprising an infrared absorbing dye for providing selective high absorption of radiation at 1064 nanometers wavelength, the first means being selected from the group consisting of platinum octaethylporphyrin and platinum deuteroporphyrin dimethyl ester.

2. A filter as in claim 1 further including a light-transmissive polymeric matrix containing the first and second means.

3. A filter as in claim 1 in which the second means comprises a tris (p-dialkylaminophenyl) aminium salt.

4. A filter as in claim 1 in which the second means comprises tris (p-diethylaminophenyl) aminium hexafluoroantimonate.

5. A filter as in claim 1 further including means providing selective high absorption of radiation at 694 nanometers wavelength.

6. A filter as in claim 5 further including a light-transmissive polymeric matrix containing the first and second and third means.

7. A filter as in claim 5 in which the third means comprises a vanadyl phthalocyanine.

8. A filter as in claim 5 in which the third means comprises vanadyl tetra-4-tert-butylphthalocyanine.

9. A filter as in claim 1 in which the first means is platinum deuteroporphyrin dimethyl ester.

* * * * *

UNITED STATES PATENT AND TRADEMARK OFFICE
CERTIFICATE OF CORRECTION

PATENT NO. : 5,271,872
DATED : December 21, 1993
INVENTOR(S) : Robert A. Sallavanti and Michael J. Lubianetsky It is certified that error appears in the above-identified patent and that said Letters Patent is hereby corrected as shown below:

Column 5, line 1, Claim 5 - after "including", insert -- third --.

Signed and Sealed this

Tenth Day of May, 1994

Attest:

BRUCE LEHMAN

Attesting Officer

Commissioner of Patents and Trademarks